(12) United States Patent
Takikawa

(10) Patent No.: US 8,116,039 B2
(45) Date of Patent: Feb. 14, 2012

(54) DISK DRIVE SUSPENSION

(75) Inventor: Kenichi Takikawa, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 577 days.

(21) Appl. No.: 12/323,566

(22) Filed: Nov. 26, 2008

(65) Prior Publication Data

US 2009/0154022 A1    Jun. 18, 2009

(30) Foreign Application Priority Data

Dec. 18, 2007 (JP) .................................. 2007-326382

(51) Int. Cl.
*G11B 5/48* (2006.01)
(52) U.S. Cl. ................................. 360/245.7; 360/245.3
(58) Field of Classification Search ................ 360/245.7
See application file for complete search history.

(56) References Cited

U.S. PATENT DOCUMENTS

| | | | |
|---|---|---|---|
| 5,838,517 A | 11/1998 | Frater et al. | |
| 6,046,883 A * | 4/2000 | Miller | 360/245.7 |
| 6,069,773 A | 5/2000 | Frater et al. | |
| 6,388,843 B1 * | 5/2002 | Takagi et al. | 360/245.7 |
| 6,445,546 B1 * | 9/2002 | Coon | 360/245.7 |
| 6,587,309 B2 * | 7/2003 | Nojima | 360/245.7 |
| 6,741,425 B1 * | 5/2004 | Wu et al. | 360/245.1 |
| 7,719,797 B1 * | 5/2010 | Mei | 360/245.7 |
| 7,764,467 B2 * | 7/2010 | Hanya et al. | 360/245.7 |
| 2007/0247760 A1 | 10/2007 | Hanya et al. | |
| 2009/0244786 A1 * | 10/2009 | Hatch | 360/294.4 |

FOREIGN PATENT DOCUMENTS

| | | |
|---|---|---|
| JP | 11-500852 A | 1/1999 |
| JP | 2002-133807 A | 5/2002 |
| JP | 2007-287296 A | 11/2007 |

OTHER PUBLICATIONS

Chinese Office Action dated Mar. 23, 2011 (and English translation thereof) in counterpart Chinese Application No. 200810183954.5.
Japanese Office Action dated Jul. 5, 2011 (and English translation thereof) in counterpart Japanese Application No. 2007-326382.

* cited by examiner

*Primary Examiner* — Son Mai
(74) *Attorney, Agent, or Firm* — Holtz, Holtz, Goodman & Chick, PC

(57) ABSTRACT

A disk drive suspension is provided with a load beam and a flexure including a tongue portion on which a slider is mounted. A pair of bent edge portions are formed by bending regions which extend along opposite side edges of the load beam in a thickness direction. A pair of limiters are formed on those parts of the load beam where the bent edge portions are provided. The limiters each include an arm portion and a retainer portion. An aperture for defining a contour of each limiter is formed in a region which extends along each side edge of the load beam. Each limiter is bent in a direction opposite to that of each corresponding bent edge portion.

6 Claims, 5 Drawing Sheets

DISK DRIVE SUSPENSION

CROSS-REFERENCE TO RELATED APPLICATIONS

This application is based upon and claims the benefit of priority from prior Japanese Patent Application No. 2007-326382, filed Dec. 18, 2007, the entire contents of which are incorporated herein by reference.

BACKGROUND OF THE INVENTION

1. Field of the Invention

The present invention relates to a disk drive suspension used in an information processing apparatus provided with a disk for use as a recording medium.

2. Description of the Related Art

A hard disk drive (HDD) for recording and reading data on and from a rotating disk includes a carriage that is turnable around a pivot. The carriage is turned around the pivot by a positioning motor. The carriage is provided with an arm (actuator arm), a suspension provided on the distal end portion of the arm, a slider mounted on the distal end portion of the suspension, etc.

The suspension is provided with a base portion including a base plate, a load beam, a flexure superposed on the load beam, etc. The slider is mounted on a tongue portion that is formed on a part of the flexure. A dimple or protuberance is formed at the distal end portion of the load beam. The dimple projects toward the slider so that its distal end abuts the tongue portion. Thus, the slider is swingably supported by the dimple. When the disk rotates, the slider flies slightly above the surface of the disk, and an air bearing is formed between the disk and the slider.

The suspension constructed in this manner is provided with means for suppressing an excessive movement of the tongue portion. In a disk drive suspension disclosed in, for example, Jpn. Pat. Appln. KOKAI Publication No. 2002-133807, a limiter for restricting the motion of a flexure is provided on the distal end portion of a load beam.

The conventional limiter includes a pair of arm portions, bent portions, retainer portions, etc. The arm portions extend individually forward from opposite sides of the distal end portion of the load beam. The bent portions are bent substantially at right angles from the respective distal ends of the arm portions along the thickness of the load beam. The retainer portions extend individually rearward from the respective distal ends of the bent portions and are opposed individually to supported portions of the flexure. When the tongue portion moves away from the dimple, the retainer portions of the limiter abut the supported portions of the flexure, whereupon the flexure is restrained from swinging.

The limiter of the conventional suspension is obtained by forming a projection for limiter formation on a side portion or the like of the load beam and bending the projection into a predetermined shape. Thus, the conventional suspension is subjected to the mass of the limiter, as well as to that of the load beam, and the mass of the load beam is increased. If the projection for the limiter is formed to protrude from a part of the load beam, moreover, the fabric (metal plate) of the load beam is inevitably enlarged by the addition of the projection.

BRIEF SUMMARY OF THE INVENTION

The object of the present invention is to provide a disk drive suspension, capable of suppressing an increase in mass of a load beam despite the use of limiters and preventing enlargement of the fabric of the load beam.

The present invention is a disk drive suspension, which comprises a load beam, a flexure which is superposed on the load beam and includes a tongue portion on which a slider is mounted, a pair of bent edge portions formed by bending regions which extend along opposite side edges of the load beam in a thickness direction of the load beam, a dimple which supports the tongue portion for swinging motion, and a limiter which suppresses a movement of the tongue portion. The limiter includes an arm portion and a retainer portion which is formed on a distal end of the arm portion and opposed to a supported portion on each of opposite sides of the tongue portion, whereby the tongue portion is restrained from moving away from the dimple. The arm portion and the retainer portion of the limiter are formed by bending a part of the region along each of the opposite side edges of the load beam, on which each of the bent edge portions is provided, in a direction opposite to that of the bent edge portion.

According to this arrangement, the limiter is formed by utilizing a part of the bent edge portion formed in the region that extends along each of the opposite side edges of the load beam. Therefore, the mass of the load beam cannot be increased by the limiter. Further, the limiter does not entail enlargement of the fabric of the load beam. Since the limiter supports the supported portion on each side of the tongue portion near the dimple, moreover, it can effectively suppress an excessive movement of the tongue portion.

In a preferred aspect of the invention, the bent edge portion of the load beam is formed with an aperture for defining a contour of the limiter, the aperture being surrounded by a bridge portion which is formed by extending a part of the bent edge portion along the length of the load beam. A pair of the limiters may be situated individually on opposite sides of the dimple.

For example, the supported portions of the flexure project individually on opposite sides of the tongue portion, and each of the supported portions is opposed to the retainer portion of the limiter in a thickness direction of the flexure. Further, offset portions bent so that the supported portions approach the bent edge portions may be provided between the tongue portion and the supported portions, individually.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will now be described with reference to FIGS. 1 to 6.

Figure 1:
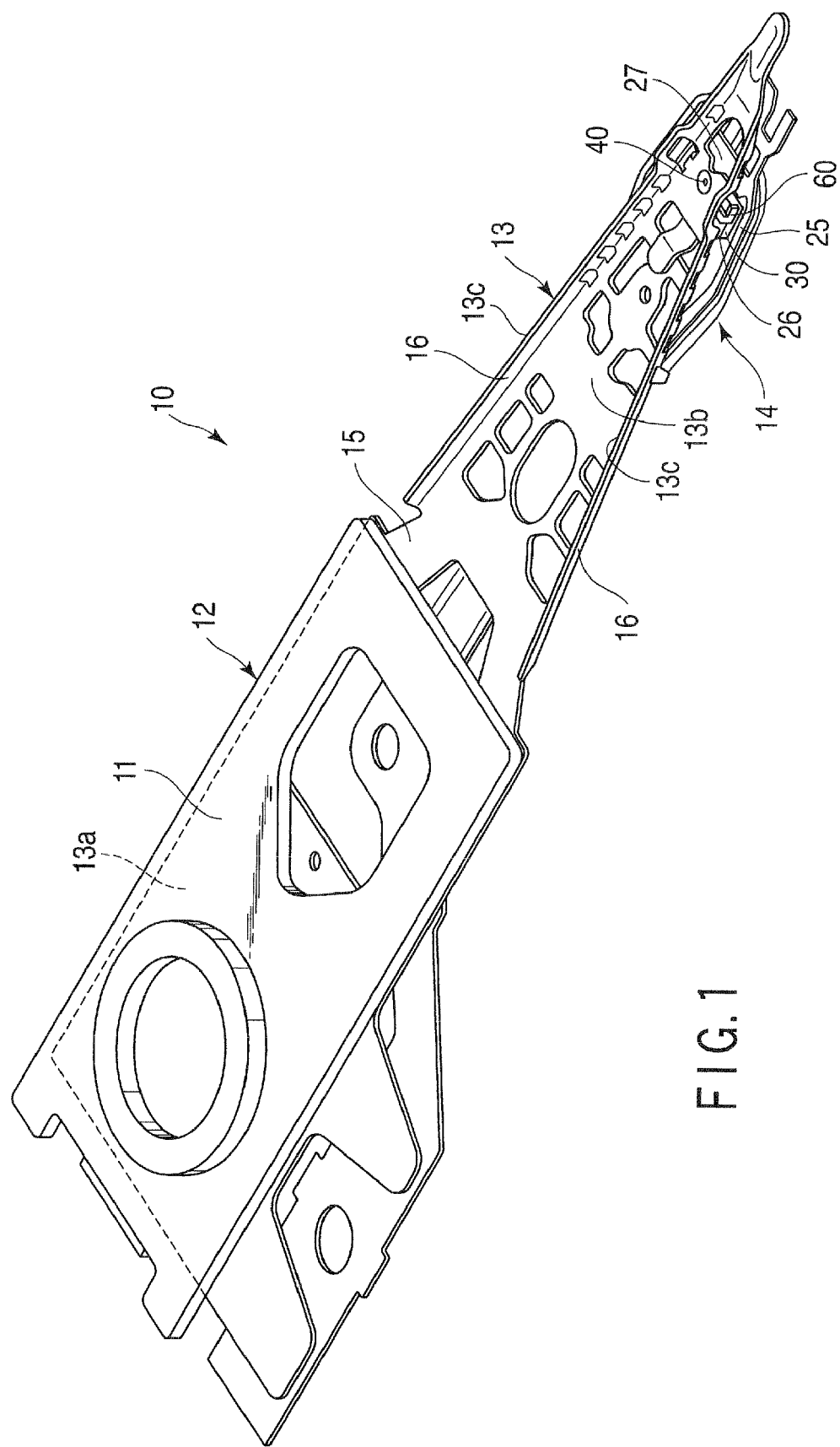
FIG. 1 is a perspective view of a disk drive suspension according to a first embodiment of the invention.

FIG. 1 shows a disk drive suspension (hereinafter referred to simply as the suspension) 10. The suspension 10 is provided with a base portion 12 including a base plate 11, a load beam 13 fixed to the base portion 12, a flexure 14 with conductor superposed on the load beam 13 in the thickness direction, etc. The base portion 12 is fixed to an actuator arm (not shown) of a carriage. The actuator arm is turned by a positioning motor that is incorporated in a disk drive.

A proximal portion 13a of the load beam 13 is fixed overlapping the base plate 11. The thickness of the load beam 13 ranges, for example, from about 30 to 100 μm. An elastic hinge portion 15 is formed on the proximal portion 13a of the load beam 13. The hinge portion 15 is formed near the base portion 12 and can be deformed in the thickness direction.

A pair of bent edge portions 16 are formed individually on the opposite side portions of the load beam 13 in order to enhance the bending stiffness of the load beam 13. The bent edge portions 16 are formed by bending those parts of the load beam 13 which extend along opposite side edges 13c in the thickness direction of the load beam 13. In some cases, the bent edge portions 16 are called side rails or box-bent portions in the art.

Figure 2:
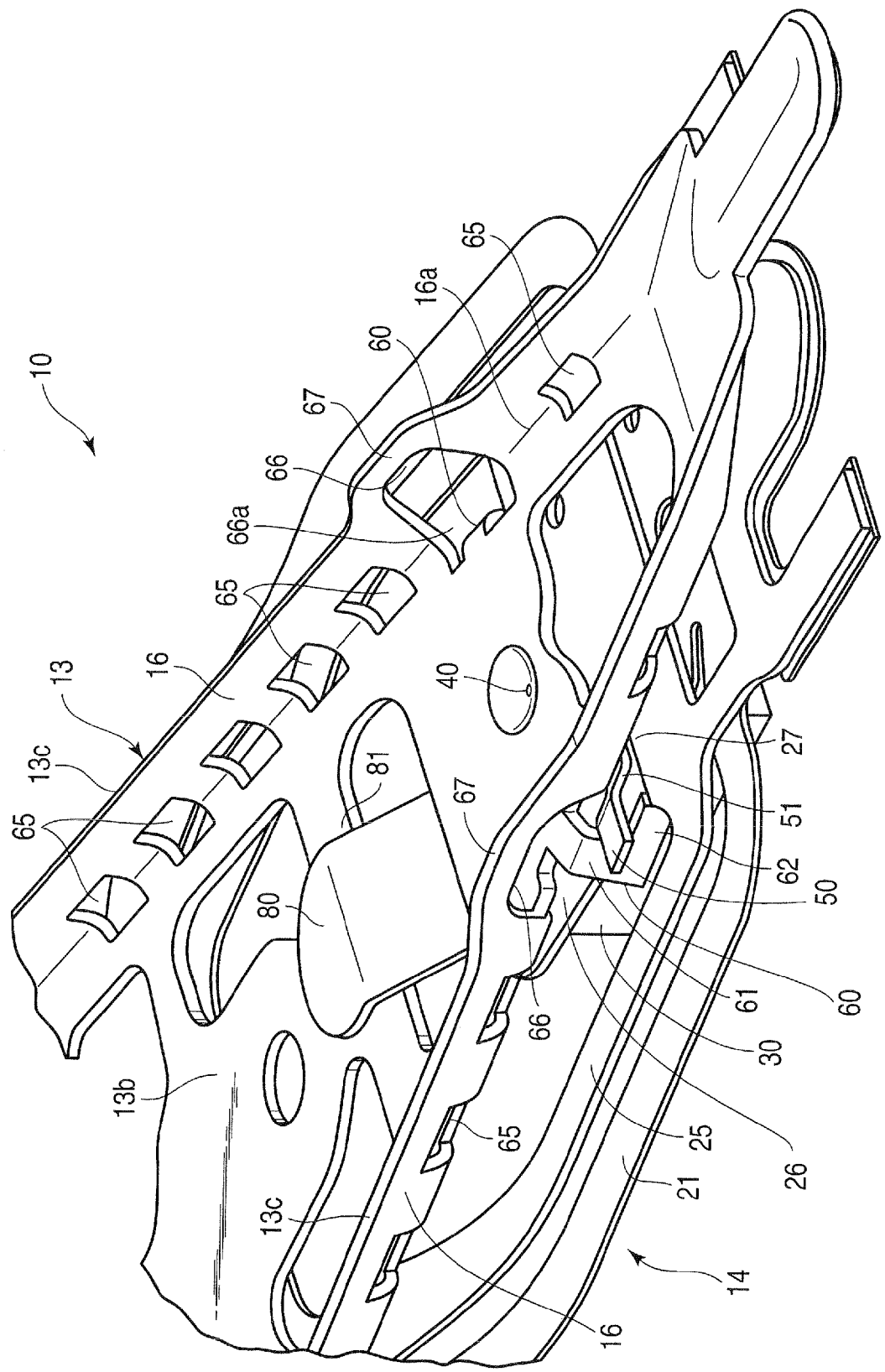
FIG. 2 is an enlarged perspective view of a distal end portion of the suspension shown in FIG. 1.
Figure 3:
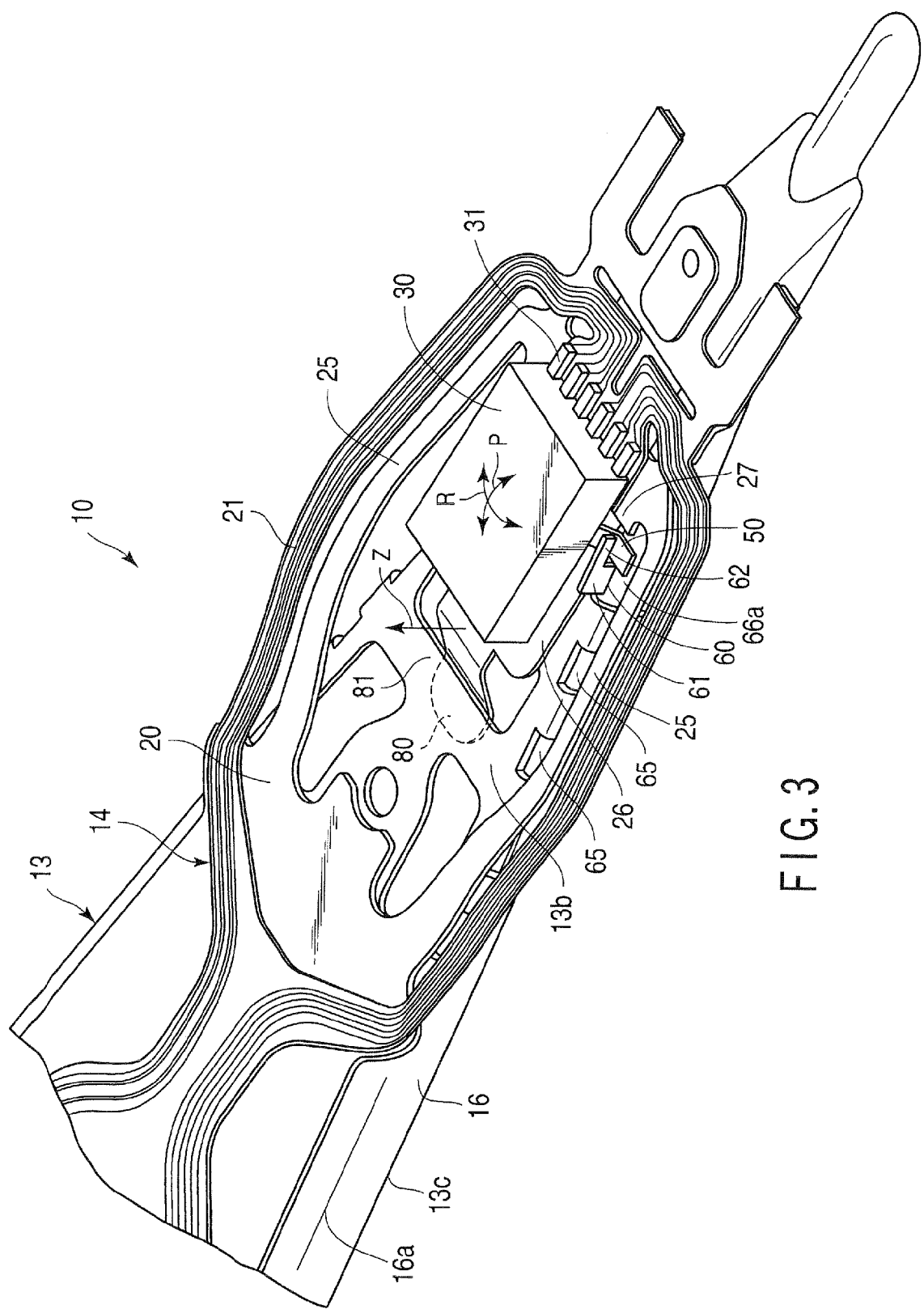
FIG. 3 is a perspective view of the distal end portion of the suspension shown in FIG. 2, taken from the side of a slider.

FIG. 2 shows a distal end portion of the suspension 10. FIG. 3 is a perspective view of the distal end portion of the suspension 10 taken from the opposite side from FIG. 2. The flexure 14 with conductor (simply called as "flexure" hereafter) is located along the load beam 13. The flexure 14 is provided with a metal base 20, a conducting member 21 with a predetermined pattern, etc. The metal base 20 is formed of a metal plate that is thinner than the load beam 13. The conducting member 21 is formed along the metal base 20 with an electrically insulating material therebetween. The metal base 20 of the flexure 14 is formed of a rolled sheet of stainless steel with a thickness of, for example, about 10 to 25 μm. The metal base 20 is fixed in a predetermined position on the load beam 13 by laser welding or the like.

The flexure 14 is provided integrally with a pair of outrigger portions 25 (left and right) and a tongue portion 26 as a movable portion. The tongue portion 26 is a part of the metal base 20 with spring characteristic and can be bend springy along the thickness of the flexure 14. The tongue portion 26 connects with the outrigger portions 25 through a continuous portion 27 that is formed near the distal end portion of the load beam 13.

A slider 30 that forms a magnetic head portion is mounted on the tongue portion 26. A transducer (not shown) for use as a magnetoelectric conversion element is provided within the slider 30. A terminal 31 of the slider 30 is electrically connected to the conducting member 21 of the flexure 14.

Figure 4:
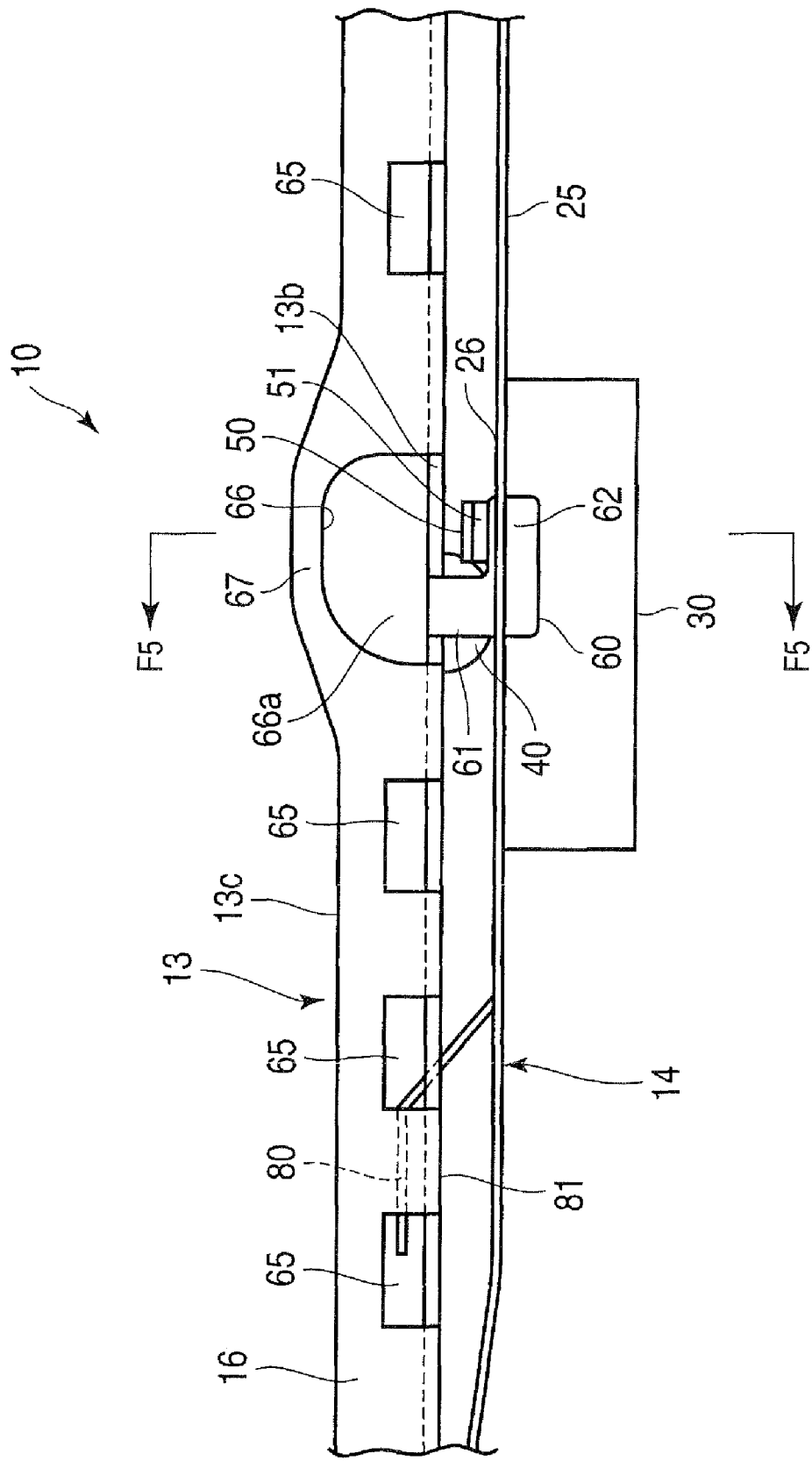
FIG. 4 is a side view of the distal end portion of the suspension of FIG. 1.
Figure 5:
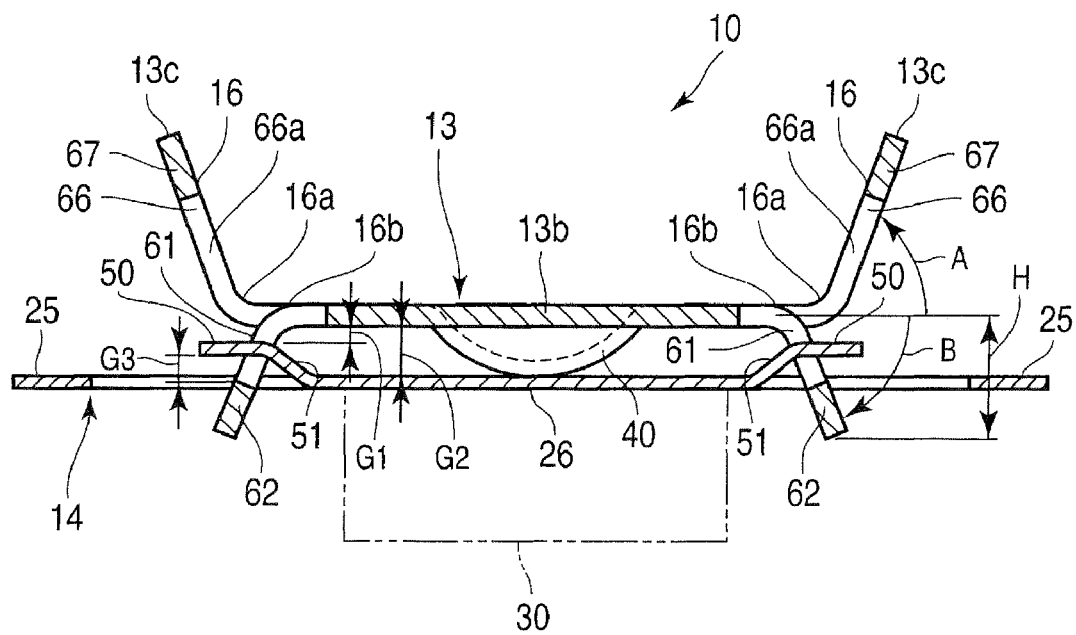
FIG. 5 is a cross-sectional view of the suspension taken along line F5-F5 of FIG. 4.

A dimple 40 is formed near the distal end portion of the load beam 13. As shown in FIGS. 4 and 5, the dimple 40 projects toward the tongue portion 26. The distal end of the dimple 40 is in contact with the tongue portion 26. Thus, the tongue portion 26, along with the slider 30, can swing in a rolling direction R (shown in FIG. 3), pitching direction P, etc., around the dimple 40. A pair of supported portions 50 project individually on the opposite sides of the tongue portion 26. The pair of supported portions 50, along with limiters 60 (mentioned later), have a function to suppress the movement of the slider 30.

As shown in FIGS. 2 and 5, offset portions 51 are provided between the tongue portion 26 and the supported portions 50, individually. The offset portions 51 are bent so that the supported portions 50 approach the bent edge portions 16. The offset portions 51 are formed by bending those parts between the tongue portion 26 and the supported portions 50 in the thickness direction. The offset portion 51 serves to make a distance G1 (shown in FIG. 5) from each supported portion 50 to a main portion 13b of the load beam 13 shorter than a distance G2 from the tongue portion 26 to the main portion 13b of the load beam 13.

As shown in FIG. 5, each of the bent edge portions 16 is formed by pressing an edge portion of the load beam 13 in the direction of arrow A by stamping or the like so that it forms an L-shape with respect to the main portion 13b. Each bent edge portion 16 is bent at an angle not more than 90° to the main portion 13b of the load beam 13 as indicated by arrow A.

The limiters 60 are provided individually on the opposite side portions of the load beam 13, or more specifically, on the transversely opposite sides of the load beam 13 with the dimple 40 between them. These limiters 60 have functions to restrain the tongue portion 26 from leaving the dimple 40 and from tilting at a predetermined angle or more in the rolling direction. Thus, the movement of the tongue portion 26 is suppressed by the limiters 60.

The limiters 60 are formed on parts of the load beam 13, or more specifically, on those regions where the bent edge portions 16 are formed. The bent edge portions 16 extend along the opposite side edges 13c of the load beam 13. Each limiter 60 includes an arm portion 61 and a retainer portion 62. The arm portion 61 is bent in a direction (indicated by arrow B in FIG. 5) opposite to that of its corresponding bent edge portion 16. The retainer portion 62 extends lengthwise (or longitudinally) of the load beam 13 from the arm portion 61. The retainer portion 62 is opposed to its corresponding supported portion 50 of the flexure 14 in the thickness direction.

Specifically, each limiter 60 includes the arm portion 61 that projects along the thickness of the load beam 13 and the retainer portion 62 formed on the distal end of the arm portion 61. As shown in FIGS. 4 and 5, each corresponding supported portion 50 of the flexure 14 is situated between the retainer portion 62 and the main portion 13b of the load beam 13. A gap G1 is defined between the supported portion 50 and the main portion 13b of the load beam 13. A gap G3 is defined between supported portion 50 and the retainer portion 62 of the limiter 60.

As the supported portions 50 are interposed between the main portion 13b of the load beam 13 and the retainer portions 62, the tongue portion 26 is restrained from leaving the dimple 40. When the slider 30 swings in the rolling direction around the dimple 40, the retainer portion 62 of one of the limiters 60 abuts its corresponding supported portion 50, whereupon the movement in the rolling direction is suppressed.

Figure 6:
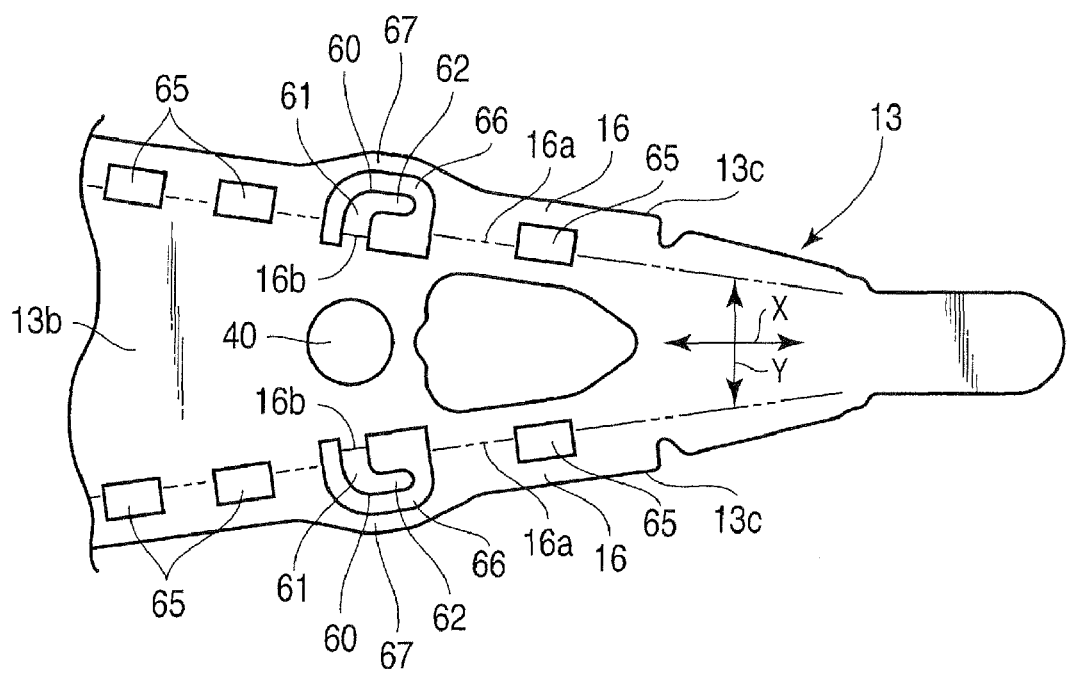
FIG. 6 is a plan view showing a load beam of the suspension of FIG. 1 with its edge portions unbent.

FIG. 6 shows a part of the load beam 13 with the edge portions 16 unbent. The pair of bent edge portions 16 are formed by bending regions that include the opposite side edges 13c of the load beam 13 along longitudinally extending bending portions 16a in the thickness direction. In order to reduce the weight of the load beam 13, a plurality of perforations 65 are formed along the bending portions 16a in the regions including the bent edge portions 16. These perforations 65 are formed by, for example, etching and fully penetrate the thickness of the load beam 13.

An aperture 66 is etched in a part of the region that includes each opposite side edge 13c of the load beam 13. The aperture 66 is formed to define the contours of the arm portion 61 and the retainer portion 62 of each limiter 60. A bridge portion 67 is formed around the aperture 66. The bridge portion 67 is formed by extending a part of each bent edge portion 16 along the length of the load beam 13. A direction indicated by arrow X in FIG. 6 is the longitudinal direction of the load beam 13. Arrow Y indicates the transverse direction of the load beam 13. Since each limiter 60 is bent in the direction opposite to that of its corresponding bent edge portion 16 along a bending portion 16b shown in FIG. 6, it projects on the side opposite the bent edge portion 16.

Since each limiter 60 of the present embodiment is formed by utilizing a part of each bent edge portion 16 of the load beam 13, the mass of the load beam 13 is not increased by it. Further, the limiters 60 do not entail enlargement of the fabric (metal plate) of the load beam 13.

As described above, each limiter 60 is obtained by forming the aperture 66 for defining its contour in a part of the load beam 13 and bending the limiter 60 in the direction opposite to that of the bent edge portion 16. Thus, an opening 66a is formed near each bent edge portion 16 by bending the limiter 60. In consequence, the mass of the load beam 13 can be further reduced.

Since the bridge portion 67 is formed around each opening 66a, each bent edge portion 16 extends continuously without interruption along the length of the load beam 13. Even though the openings 66a are formed by bending the limiters 60, therefore, the bridge portions 67 can prevent the load beam 13 from becoming less stiff.

Further, the limiters 60 of the present embodiment are situated individually on the opposite sides of the dimple 40. Therefore, the tongue portion 26 and the slider 30 can be effectively prevented from leaving the dimple 40 or swinging excessively. Since the offset portions 51 are provided between the tongue portion 26 and the supported portions 50, moreover, the distance from each supported portion 50 to its corresponding bending portion 16b can be reduced. Thus, a projection height H (shown on the right side of FIG. 5) of the retainer portion 62 of each limiter 60 can be reduced.

In addition to the limiters 60, a rear limiter 80 (shown in FIGS. 1 to 4) is formed at the rear end (on the side opposite the continuous portion 27) of the tongue portion 26. The rear limiter 80 is opposed to a part 81 of the load beam 13 and restrains the tongue portion 26 from moving a predetermined distance or more in the direction of arrow Z in FIG. 3.

It is to be understood, in carrying out the invention, that the specific configurations, shapes, and arrangements of the load beam, flexure, limiters, etc., may be embodied in variously modified forms without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension, comprising:
    a load beam;
    a flexure which is superposed on the load beam and includes a tongue portion on which a slider is mounted;
    a pair of bent edge portions formed by bending regions which extend along opposite side edges of the load beam in a thickness direction of the load beam;
    a dimple which supports the tongue portion for swinging motion; and
    a limiter which suppresses a movement of the tongue portion,
    wherein the limiter includes an arm portion and a retainer portion which is formed on a distal end of the arm portion and is opposed to a supported portion on each of opposite sides of the tongue portion, whereby the tongue portion is restrained from moving away from the dimple, and the arm portion and the retainer portion of the limiter are formed by bending a part of the region along each said opposite side edge of the load beam, on which each said bent edge portion is provided, in a direction opposite to that of the bent edge portion, and
    wherein the bent edge portion of the load beam is formed with an aperture for defining a contour of the limiter, the aperture being surrounded by a bridge portion which is formed by extending a part of the bent edge portion along the length of the load beam.

2. The disk drive suspension according to claim 1, wherein a pair of said limiters are situated individually on opposite sides of the dimple.

3. The disk drive suspension according to claim 1, wherein the supported portions of the flexure project individually on opposite sides of the tongue portion, and each of the supported portions is opposed to the retainer portion of the limiter in a thickness direction of the flexure.

4. The disk drive suspension according to claim 2, wherein the supported portions of the flexure project individually on opposite sides of the tongue portion, and each of the supported portions is opposed to the retainer portion of the limiter in a thickness direction of the flexure.

5. The disk drive suspension according to claim 3, wherein offset portions are provided between the tongue portion and the supported portions, individually, the offset portions being bent so that the supported portions approach the bent edge portions.

6. The disk drive suspension according to claim 4, wherein offset portions are provided between the tongue portion and the supported portions, individually, the offset portions being bent so that the supported portions approach the bent edge portions.

* * * * *